Feb. 15, 1927.
L. P. HYNES
1,617,487
THERMOSTAT
Filed June 9, 1922
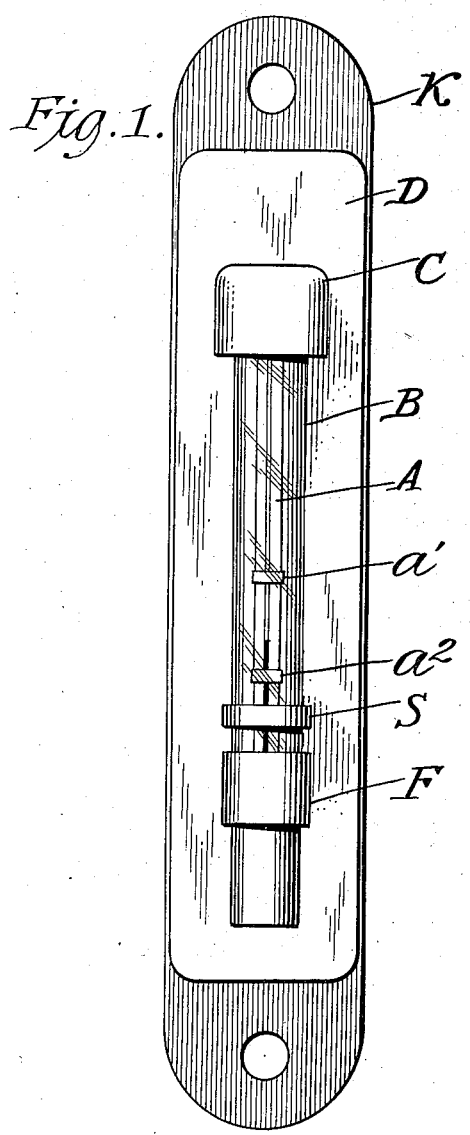
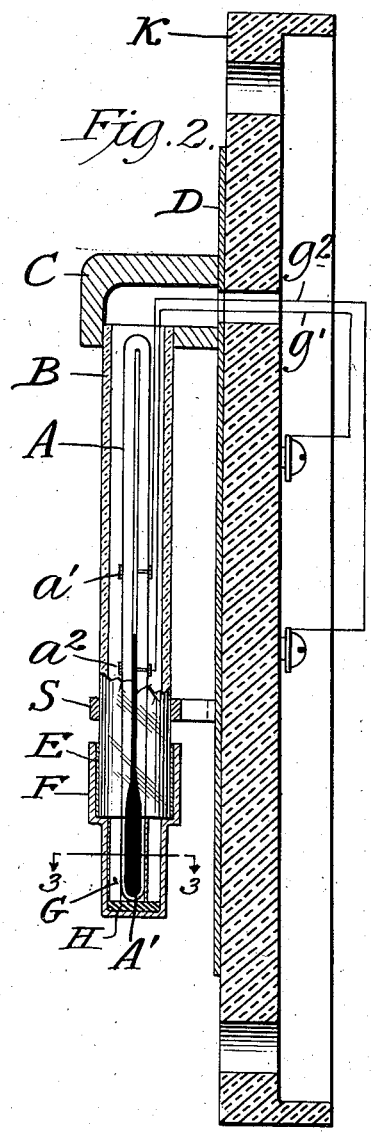
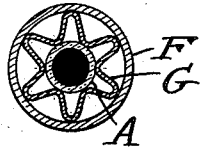
INVENTOR
LEE P. HYNES
BY
E. M. Bentley
ATTORNEY Patented Feb. 15, 1927.

1,617,487

UNITED STATES PATENT OFFICE.

LEE P. HYNES, OF ALBANY, NEW YORK, ASSIGNOR TO CONSOLIDATED CAR-HEATING COMPANY, OF ALBANY, NEW YORK, A CORPORATION OF WEST VIRGINIA.

THERMOSTAT.

Application filed June 9, 1922. Serial No. 567,191.

For a detailed description of the present form of my invention, reference may be had to the following specification and to the accompanying drawings forming a part thereof, wherein, Fig. 1 is a front elevation of my device;
Fig. 2 is a longitudinal section thereof and
Fig. 3 is a section on the line 3—3 of Fig. 2.

My invention comprises a mercury thermostat flexibly mounted for use in railway vehicles and in other situations subject to jarring and enclosed in an external transparent casing through which the condition of the mercury column can be observed. In addition the bulb of the thermometer is connected thermally to a heat insulated detector which responds independently to changes of atmospheric temperature and transmits the temperature conditions to the bulb and thence to the mercury column therein.

Referring to the drawing, A represents a glass thermometer tube with a mercury column therein and $A^1$ is the bulb portion thereof. Contacts $a^1$ and $a^2$ are sealed into the glass tube to connect electrically with the mercury therein when it rises to the desired degree and $g^1$, $g^2$ are the circuit wires leading from the respective contacts. The thermometer bulb is seated in a ring G of thin corrugated copper (shown in section in Fig. 3) which is in thermal connection with a detector F which is a cup-shaped piece or cap of metal extremely sensitive to changes of atmospheric temperature and which transmits such changes through the corrugated ring G to the mercury in the bulb of the thermometer. H is a layer of rubber or similar cushioning material in the bottom of the cup-shaped detector that also gives a resilient base for the bulb to rest on. B is a transparent tubular casing preferably of heavy glass, which surrounds but is spaced away from the thermometer tube and allows the mercury column to be observed while also protected from mechanical injury by the heavy glass of the casing. The lower end of the tubular casing B is carried by a bracket-ring S and its upper end by a hollow bracket C. D is a metal back-plate which carries the two brackets S and C and is seated on the front face of a moulded base K. By the construction aforesaid it will be manifest that the glass casing B not only protects the thermometer tube A, but also permits inspection of said tube to make certain that the mercury column is not broken so as to prevent its closing the electric circuit between contacts $a^1$, $a^2$. Such separation or break of the column frequently occurs from various causes and when the column is covered over, as it ordinarily is, by a non-transparent casing, the inoperative condition of the device which such a separation produces, escapes discovery. By my arrangement the condition of the column is constantly exposed to observation and inspection. Moreover, the glass casing B also serves to thermally insulate the cap or detector F from other parts of the instrument so that the detector is highly sensitive to temperature changes, being independent of such mere sluggish changes as may occur in the other parts foresaid. The construction is also simple and neat in appearance.

What I claim as new and desire to secure by Letters Patent is:

1. A thermostat comprising a thermometer tube, a tubular transparent casing therefor, and a temperature detector external to the casing, said thermometer tube having a portion engaging said detector externally of said casing.

2. A thermostat comprising a thermometer tube, an external transparent nonmetallic casing surrounding the thermometer tube, and a metallic temperature-detector outside of the nonmetallic casing and insulated thereby, said detector having means for contacting with the bulb of the thermometer.

3. A thermostat comprising a thermometer-tube, a nonmetallic transparent casing therefor from one end of which the bulb of said thermometer tube protrudes, and a metallic temperature-detector enclosing the protruding end of the thermometer and conductively connected with the bulb.

4. A thermostat comprising a thermometer-tube, a transparent non-metallic casing therefor, means for mounting said casing on a suitable base, a metallic cap on the lower end of the casing and a cushioning support in said cap for the theremometer-tube.

5. A thermostat comprising a thermometer-tube, a transparent non-metallic casing therefor, means for mounting said casing on a suitable base, and a separate cushioning support for the said tube holding it in place within said casing.

6. A thermostat comprising a thermometer-tube, a transparent casing therefor, means for mounting said casing on a suitable base, a metallic cap on the casing and a cushioning support within said cap for the thermometer-tube including a thermal connection between said cap and the thermometer bulb.

7. A thermostat comprising a thermometer-tube, a glass tube outside said thermometer-tube, top and bottom brackets for supporting said glass tube on a suitable base and an exposed metal cap on the lower end of the glass tube constituting a temperature-detector in thermal connection with the thermometer bulb.

8. A thermostat comprising a thermometer-tube, an external glass casing therefor, a metallic temperature-detector closing one end of the glass casing and thermally insulated thereby, a cushion support for the thermometer, and an intermediate thermal conductor between said insulated detector and the thermometer bulb.

9. A thermostat comprising a thermometer-tube, a larger glass tube enclosing the thermometer-tube, supporting brackets for the glass tube, a metallic cap on the lower end of said glass tube and thermally insulated thereby, and a cushioning support in said cap for the thermometer-tube including a metal strip thermally connecting said cap with the thermometer bulb.

10. A thermostat comprising a thermometer-tube, an external transparent non-metallic tube outside of and spaced from said thermometer-tube, and an insulated temperature-detector embracing the thermometer bulb at a point beyond the end of said casing, with a metallic thermal conductor spacing the bulb from said detector and connecting it thermally therewith.

Signed at Albany, county of Albany, State of New York, this 5th day of June, 1922.

LEE P. HYNES.